United States Patent
Hong et al.

(10) Patent No.: US 10,726,516 B2
(45) Date of Patent: Jul. 28, 2020

(54) ARITHMETIC LOGIC UNIT (ALU)-CENTRIC OPERATIONS IN GRAPHICS PROCESSING UNITS (GPUS)

(71) Applicant: Futurewei Technologies, Inc., Plano, TX (US)

(72) Inventors: Zhou Hong, Cupertino, CA (US); Yufei Zhang, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/157,969

(22) Filed: Oct. 11, 2018

(65) Prior Publication Data

US 2020/0118238 A1 Apr. 16, 2020

(51) Int. Cl.
| | |
|---|---|
| G06T 15/00 | (2011.01) |
| G06F 9/30 | (2018.01) |
| G06T 1/20 | (2006.01) |
| G06T 1/60 | (2006.01) |

(52) U.S. Cl.
CPC .............. *G06T 1/20* (2013.01); *G06F 9/3001* (2013.01); *G06F 9/3012* (2013.01); *G06F 9/30043* (2013.01); *G06F 9/30047* (2013.01); *G06T 1/60* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 7,680,988 B1 * | 3/2010 | Nickolls | G06F 12/084 711/149 |
| 2006/0120524 A1 | 6/2006 | Avidan et al. | |
| 2007/0292047 A1 * | 12/2007 | Jiao | G06F 17/153 382/279 |
| 2013/0166877 A1 * | 6/2013 | Choquette | G06F 9/3851 712/20 |
| 2015/0379670 A1 | 12/2015 | Koker et al. | |
| 2019/0012170 A1 * | 1/2019 | Qadeer | G06T 15/005 |
| 2019/0102640 A1 * | 4/2019 | Balasubramanian | G06F 3/0625 |
| 2019/0294413 A1 * | 9/2019 | Vantrease | G06F 7/5443 |

FOREIGN PATENT DOCUMENTS

| | | |
|---|---|---|
| CN | 108537719 A | 9/2018 |
| CN | 108615262 A | 10/2018 |

OTHER PUBLICATIONS

Machine Translation and Abstract of Chinese Publication No. CN108537719, dated Sep. 14, 2018, 14 pages.
Machine Translation and Abstract of Chinese Publication No. CN108615262, dated Oct. 2, 2018, 10 pages.
Foreign Communication From A Counterpart Application, PCT Application No. PCT/CN2019/110506, English Translation of International Search Report dated Jan. 15, 2020, 10 pages.

\* cited by examiner

*Primary Examiner* — Joni Hsu
(74) *Attorney, Agent, or Firm* — Conley Rose, P.C.

(57) ABSTRACT

A GPU comprises: a GPR comprising registers; an L1 cache coupled to the GPR and configured to implement a pixel mapping by: segregating pixels of an image into regions, the regions comprise a first region and a second region, the first region comprises first pixels, and the second region comprises second pixels, loading the first pixels into the GPR in a horizontal manner, and loading the second pixels into the GPR in a vertical manner; and an ALU configured to read the first pixels and the second pixels independently of a shared memory.

20 Claims, 10 Drawing Sheets

120

Thread Mapping
900

| T0 | T1 | T2 | T3 | T4 | T5 | T6 | T7 |
| T8 | T9 | T10 | T11 | T12 | T13 | T14 | T15 |
| T16 | T17 | T18 | T19 | T20 | T21 | T22 | T23 |
| T24 | T25 | T26 | T27 | T28 | T29 | T30 | T31 |

ARITHMETIC LOGIC UNIT (ALU)-CENTRIC OPERATIONS IN GRAPHICS PROCESSING UNITS (GPUS)

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Hardware accelerators are computer hardware components that perform operations in place of software in general-purpose central processing units (CPUs). Chip designers implement hardware accelerators when the hardware accelerators perform those operations more efficiently than the software. A graphics processing unit (GPU) is one type of hardware accelerator that uses memory components to create images intended for output to displays.

SUMMARY

In one embodiment, the disclosure includes a GPU comprising: a general purpose register (GPR) comprising registers; a level 1 (L1) cache coupled to the GPR and configured to implement a pixel mapping by: segregating pixels of an image into regions, the regions comprise a first region and a second region, the first region comprises first pixels, and the second region comprises second pixels, loading pixel data for the first pixels into the GPR in a horizontal manner, and loading pixel data for the second pixels into the GPR in a vertical manner; and an arithmetic logic unit (ALU) configured to read the first pixels and the second pixels independently of a shared memory. To load pixels into registers, an L1 cache locates data in its memory pool based on memory address calculations. The data represent the pixels. The L1 cache then pushes the data into a memory bus along with lane information and destination addresses of the register. Finally, the memory bus sends the data to the registers according to the destination addresses. This process is loosely referred to herein as "loading pixels." An L1 cache loads starting pixels and bottom padding pixels into registers in a horizontal manner. Thus, the L1 cache loads the starting pixels into register R12 beginning with pixel p00 and proceeding horizontally to pixel p07, then moving to pixel p10 and proceeding horizontally to pixel p17. In some embodiments, the regions comprise a third region with third pixels, and wherein the L1 cache is further configured to implement the pixel mapping by loading the third pixels into the GPR in the horizontal manner; the first pixels are starting pixels, the second pixels are right padding pixels, and the third pixels are bottom padding pixels; the registers comprise an anchor register, and wherein the L1 cache is further configured to implement the pixel mapping by further loading the first pixels and the second pixels beginning with the anchor register and based on fixed offsets; the registers comprise an anchor register, and wherein the L1 cache is further configured to implement the pixel mapping by further loading the first pixels beginning with the anchor register and based on a positive offset from the anchor register; the registers comprise an anchor register, and wherein the L1 cache is further configured to implement the pixel mapping by further loading the second pixels based on a negative offset from the anchor register; the pixel mapping is independent of a filter size; and the ALU is further configured to perform a convolution operation based on the pixel mapping. The bottom padding pixels comprise pixels p40~p77.

In another embodiment, the disclosure includes a method implemented in a GPU, the method comprising: defining a sliding window at a first position in a group of pixels of an image; calculating a first dot product of a convolution operation using the sliding window in the first position; sliding the sliding window from the first position to a second position in the group; calculating a second dot product of the convolution operation using the sliding window in the second position; and adding the first dot product and the second dot product. Dot products are part of the convolution operation and may be referred to as intermediate calculations because they occur before the convolution operation ends by adding the dot products. An accumulator adds the dot products from an operation pipeline to calculate an output image. In some embodiments, the method further comprises determining the first position is not a right-most position in the group, wherein the second position is one column to the right of the first position; the method further comprises determining the first position is a right-most position in the group, wherein the second position is one row below the first position and to the farthest left column; the convolution operation implements a filter of size S×R, wherein S is a width and is a positive integer, and wherein R is a height and is a positive integer; the method further comprises sliding the sliding window a total of S×R times to complete the convolution operation; the sliding window comprises 4 rows and 8 columns of the pixels; and the image is associated with a plurality of channels, and wherein the method further comprises performing the convolution operation for each channel.

In yet another embodiment, the disclosure includes a GPU comprising: an instructions cache configured to: store a load instruction associated with shared pixels, and store a convolution instruction associated with the shared pixels; an L1 cache configured to execute the load instruction using the shared pixels; and an ALU coupled to the instructions cache and the L1 cache and configured to: store the shared pixels independent of a shared memory, and execute the convolution instruction using the shared pixels. In some embodiments, the ALU comprises a sliding window cache configured to store the shared pixels; the shared memory is external to the ALU; the GPU further comprises a GPR, wherein the L1 cache is further configured to load the shared pixels in the GPR, and wherein the ALU is further configured to read the shared pixels from the GPR; and the ALU comprises an accumulator configured to store intermediate calculations of an operation.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations, acronyms, and initialisms apply:

ALU: arithmetic logic unit
CPU: central processing unit
FAU: fast access uniform
GPR: general purpose register
GPU: graphics processing unit
L1: level 1
RAM: random-access memory
RGB: red-green-blue
ROM: read-only memory
2D: two-dimensional
3D: three-dimensional.

Figure 1:
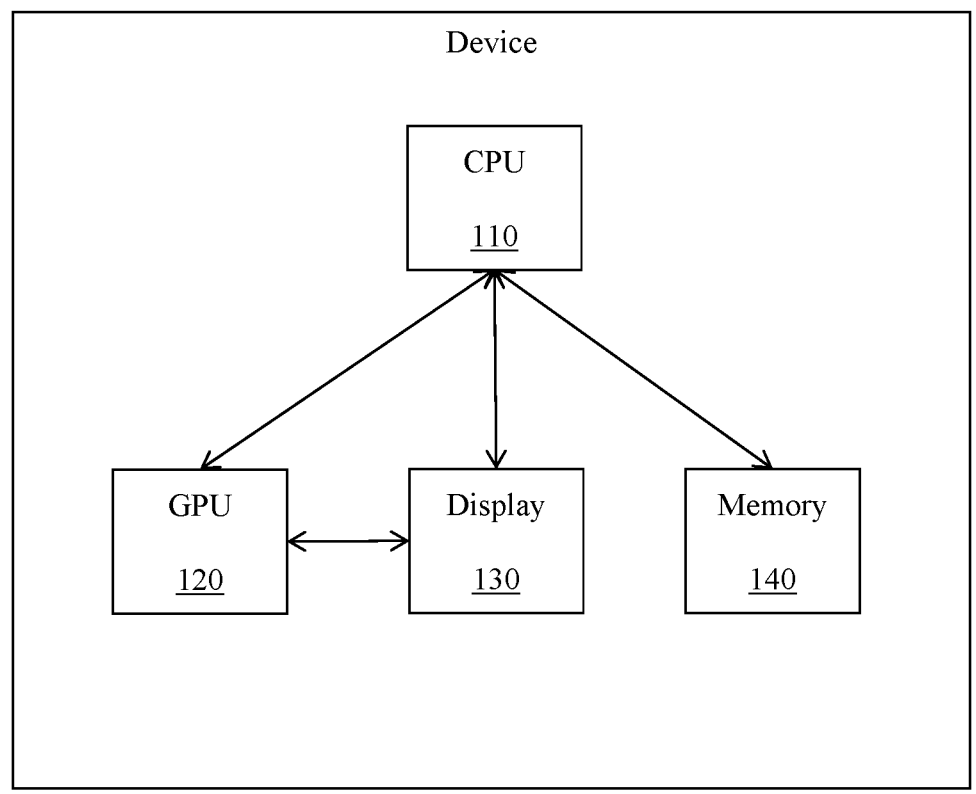
FIG. 1 is a schematic diagram of a device.

FIG. 1 is a schematic diagram of a device 100. The device 100 is a mobile phone, a desktop computer, a notebook computer, or another suitable device. The device 100 comprises a CPU 110, a GPU 120, a display 130, and a memory 140. The CPU 110 processes instructions stored in the memory 140. The GPU 120 processes instructions stored in the GPU 120, and the GPU 120 instructs the display 130 to display images in response. The memory 140 is a RAM or another suitable form of memory.

Figure 2:
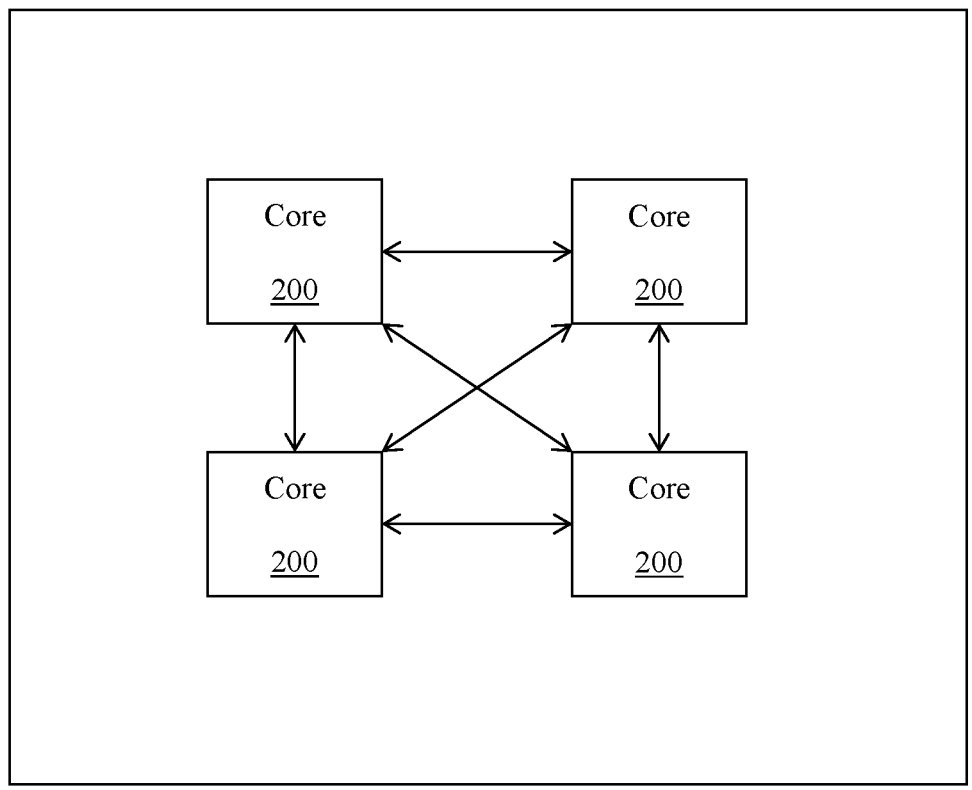
FIG. 2 is a schematic diagram of the GPU in FIG. 1.

FIG. 2 is a schematic diagram of the GPU 120 in FIG. 1. The GPU 120 comprises four cores 200. The cores 200 work together to, for instance, perform parallel processing. Though four cores 200 are shown, the GPU 120 may comprise any number of the cores 200.

Figure 3:
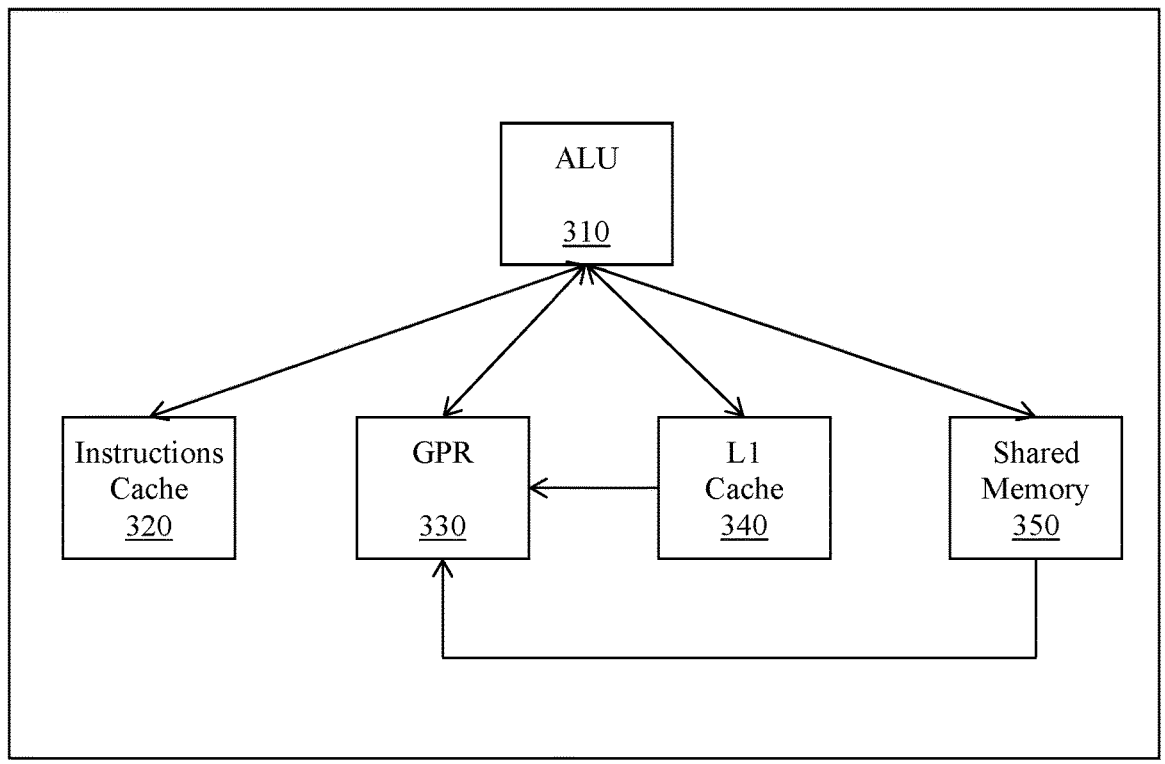
FIG. 3 is a schematic diagram of a core.

FIG. 3 is a schematic diagram of a core 300. The core 300 implements the cores 200 in FIG. 2. The core 300 comprises an ALU 310, an instructions cache 320, a GPR 330, an L1 cache 340, and a shared memory 350.

The ALU 310 is a hardware processor that performs convolution, pooling, and other operations by executing warps and using data. Warps are groups of threads. A thread is a smallest hardware operation element and has a lifetime. The ALU 310 reads from and writes to the GPR 330.

The instructions cache 320 stores instructions. In its lifetime, a thread decodes instructions from the instruction cache 320 and executes the instructions in the ALU 310. The instructions cache 320 is a ROM or another suitable form of memory.

The GPR 330 is logically partitioned so that each thread has its own non-overlapped space of the GPR 330, though multiple threads may access a space of the shared memory 350 at the same time. The GPR 330 obtains its data primarily from the L1 cache 340. The GPR 330 is a RAM or another suitable form of memory.

The L1 cache 340 is a primary, fastest cache in the core 300. Though the L1 cache 340 is a memory, it is also able to decode load instructions, perform memory address calculations, locate data in its memory pool based on the memory address calculations, and perform other actions. The L1 cache 340 obtains its data from an external memory such as the memory 140 in FIG. 1. The L1 cache 340 and the shared memory 350 are RAMs or other suitable forms of memory.

For a convolution operation, the ALU 310 applies a filter to an input image in order to obtain an output image. The input image comprises input pixels, and the output image comprises output pixels. Pixels represent data at coordinates (x,y) for each channel. The channels are discrete components of the image. For instance, an RGB image comprises three channels: a red channel, a green channel, and a blue channel. Typically, thread 0 of a warp performs calculations on a first group of the input pixels, thread 1 of the warp performs calculations on a second group of the input pixels, and so on. When the threads are described as performing the calculations, it is understood that the ALU 310 is performing the calculations by executing instructions. To perform their associated calculations, each thread uses pixels associated with other threads. Such pixels may be referred to as shared pixels. However, the GPR 330 cannot store shared pixels. To solve that problem, the ALU 310 may first move pixels from the GPR 330 to the shared memory 350 to create shared pixels, then move the shared pixels to the GPR 330 so that each thread in a warp can have its own copy of the pixels. However, read and write operations involving the shared memory 350 reduce operation speed and increase power consumption.

Disclosed herein are embodiments for ALU-centric operations in GPUs. An L1 cache loads pixels into a GPR using a pixel mapping and independently of a filter size, meaning the L1 cache can do so for a filter of any size, which simplifies a design of the L1 cache. An ALU reads some of the pixels from the GPR and stores those pixels as a sliding window in a sliding window cache of the ALU instead of in a shared memory, which eliminates read and write operations associated with the shared memory, which in turn improves the speed of operations, reduces power consumption, and eliminates the need for the shared memory. By storing the pixels in the sliding window cache instead of in a shared memory, the ALU stores the pixels independently of a shared memory. The sliding window slides in a contiguous manner and in a traversing pattern that yields a simplest hardware design, which further improves the speed of operations and reduces power consumption. Finally, an accumulator in the ALU buffers intermediate calculations until the threads no longer need the intermediate calculations, which reduces hardware requirements and further reduces power consumption. The embodiments apply to convolution, pooling, and other operations for pixels and other data.

Figure 4:
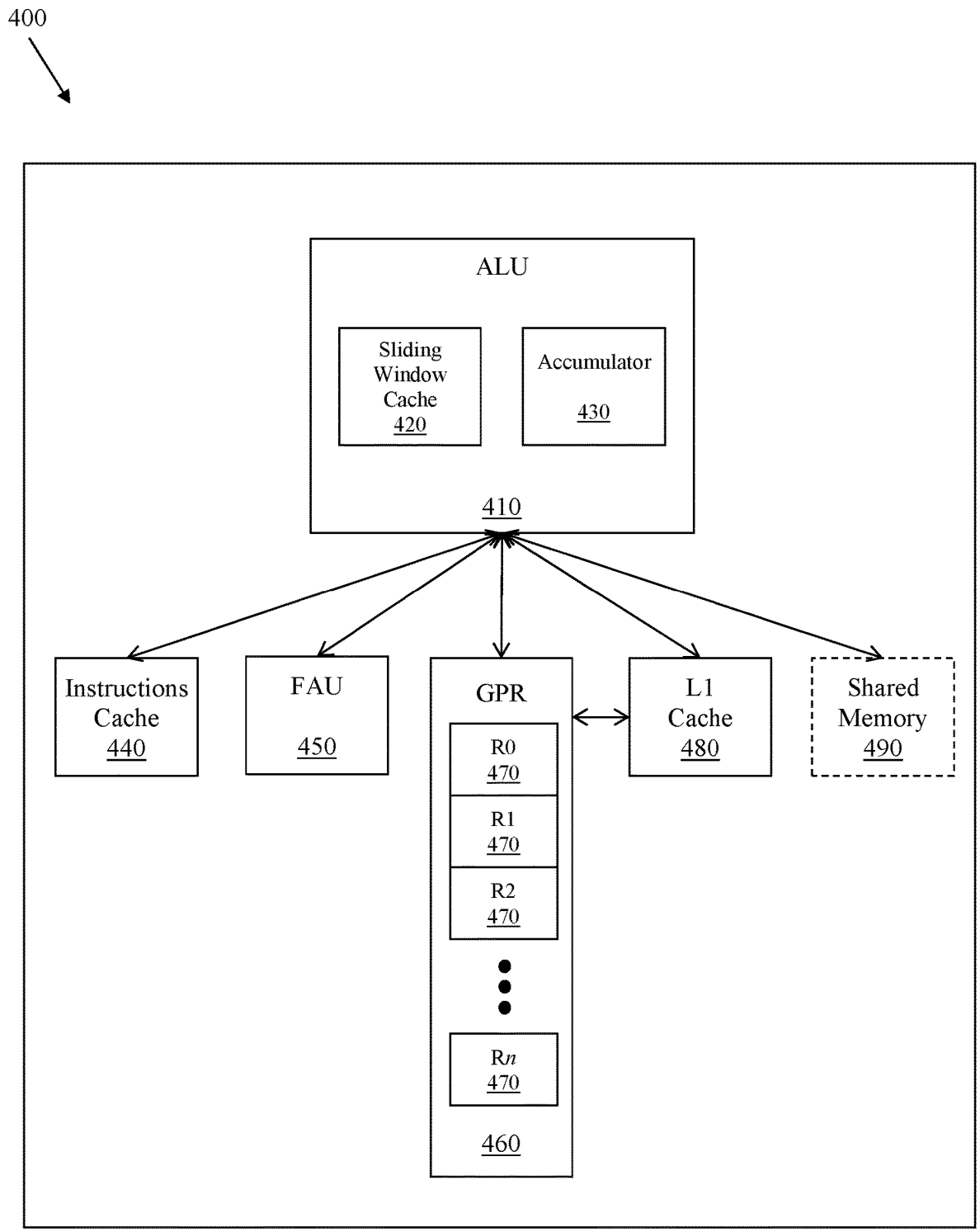
FIG. 4 is a schematic diagram of a core according to an embodiment of the disclosure.

FIG. 4 is a schematic diagram of a core 400 according to an embodiment of the disclosure. The core 400 implements the cores 200 in FIG. 2. The core 400 in FIG. 4 is similar to the core 300 in FIG. 3. Specifically, the core 400 comprises an ALU 410, an instructions cache 440, a GPR 460, an L1 cache 480, and a shared memory 490, which are similar to the ALU 310, the instructions cache 320, the GPR 330, the L1 cache 340, and the shared memory 350, respectively, in the core 300.

However, unlike the ALU 310, the ALU 410 comprises a sliding window cache 420 and an accumulator 430; unlike the core 300, the core 400 comprises an FAU 450; unlike the GPR 330, the GPR 460 is shown as comprising registers $R_0$-Rn 470, where n is a positive integer such as 191 and is based on a capacity of the GPR 460; and unlike the core 300, the core 400 may omit the shared memory 490. The components of the core 400 may therefore perform their functions independent of the shared memory 490. The registers 470 each comprise, for instance, 1,024 bits. The components are coupled to each other as shown through buses, including memory buses.

The sliding window cache 420 comprises a set of flip-flops. Flip-flops are circuits that store state information for one of two states based on control signals. The sliding window cache 420 comprises buffer A and buffer B. The sliding window cache 420 stores all pixels for a warp at each iteration of the ALU 410 in buffer A and copies any pixels that will be used in a subsequent iteration into buffer B. The accumulator 430 also comprises a set of flip-flops. The accumulator 430 buffers intermediate calculations until they are no longer needed. The FAU 450 is a ROM or another suitable form of memory. The FAU 450 stores weights or other constants.

Figure 5:
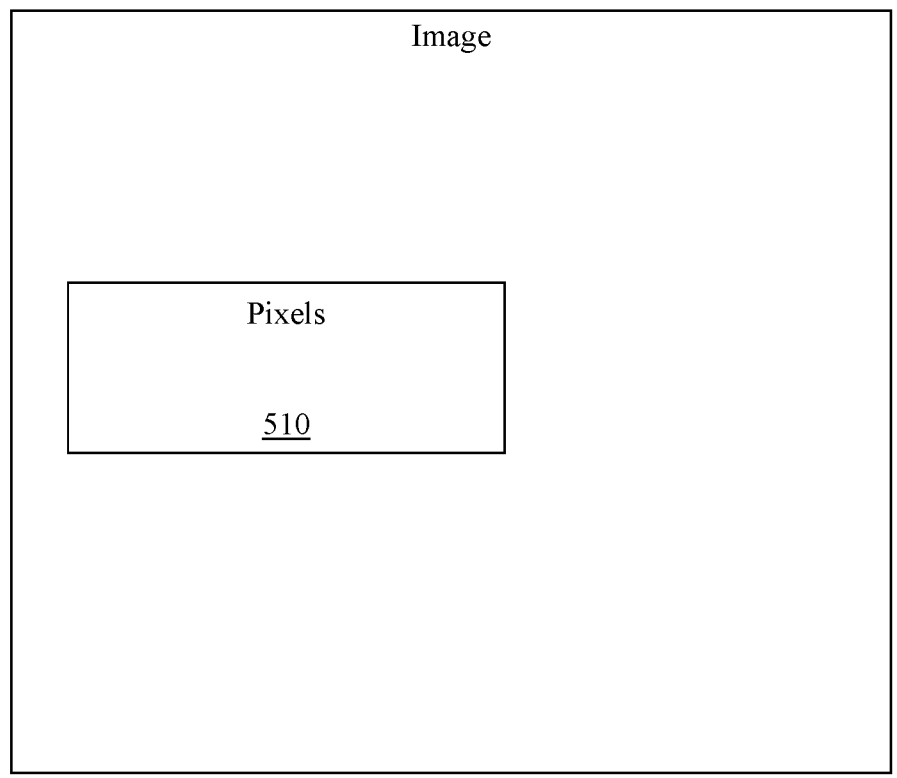
FIG. 5 is a schematic diagram of an image.

FIG. 5 is a schematic diagram of an image 500. The image 500 comprises pixels 510, which are discussed below. The pixels 510 each comprise 64 bits for four channels, meaning 16 bits per channel. The image 500 comprises other pixels that are like the pixels 510, but are not shown or discussed below.

Figure 6:
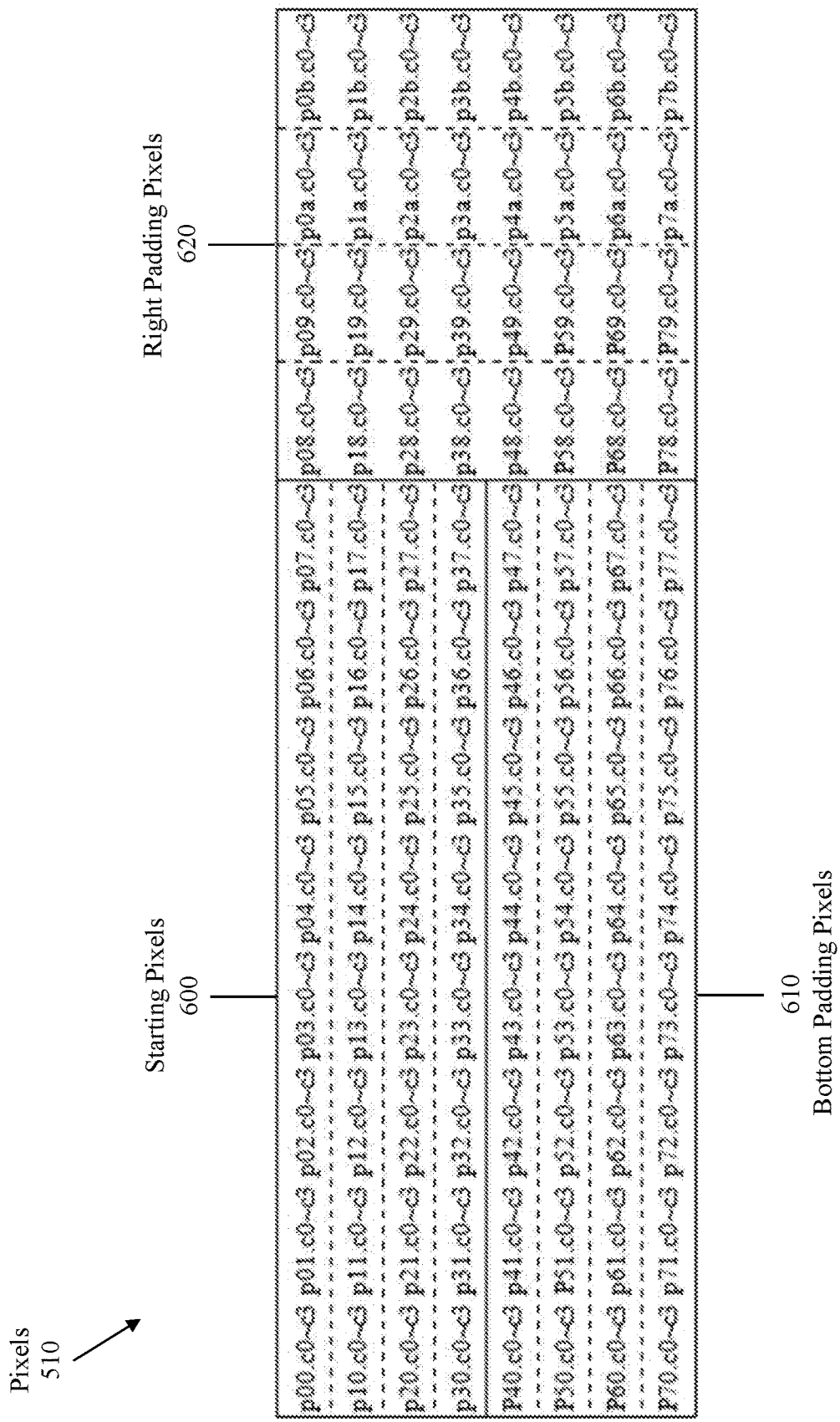
FIG. 6 is a schematic diagram showing numbering of the pixels in FIG. 5.

FIG. 6 is a schematic diagram showing numbering of the pixels 510 in FIG. 5. The pixels 510 comprise three regions, which are starting pixels 600, bottom padding pixels 610, and right padding pixels 620. The pixels 510 are denoted as pij.c0~c3, where p denotes a pixel, 0≤i≤7, 0≤j≤b, a=10, b=11, and c0~c3 denotes each of channels 0~3. For simplicity of discussion, c0~c3 may be omitted so that, for instance, the top-left pixel is referred to as pixel p00. Thus, the starting pixels 600 comprise pixels p00~p37, the bottom padding pixels 610 comprise pixels p40~p77, and the right padding pixels 620 comprise pixels p08~p7b.

Figure 7:
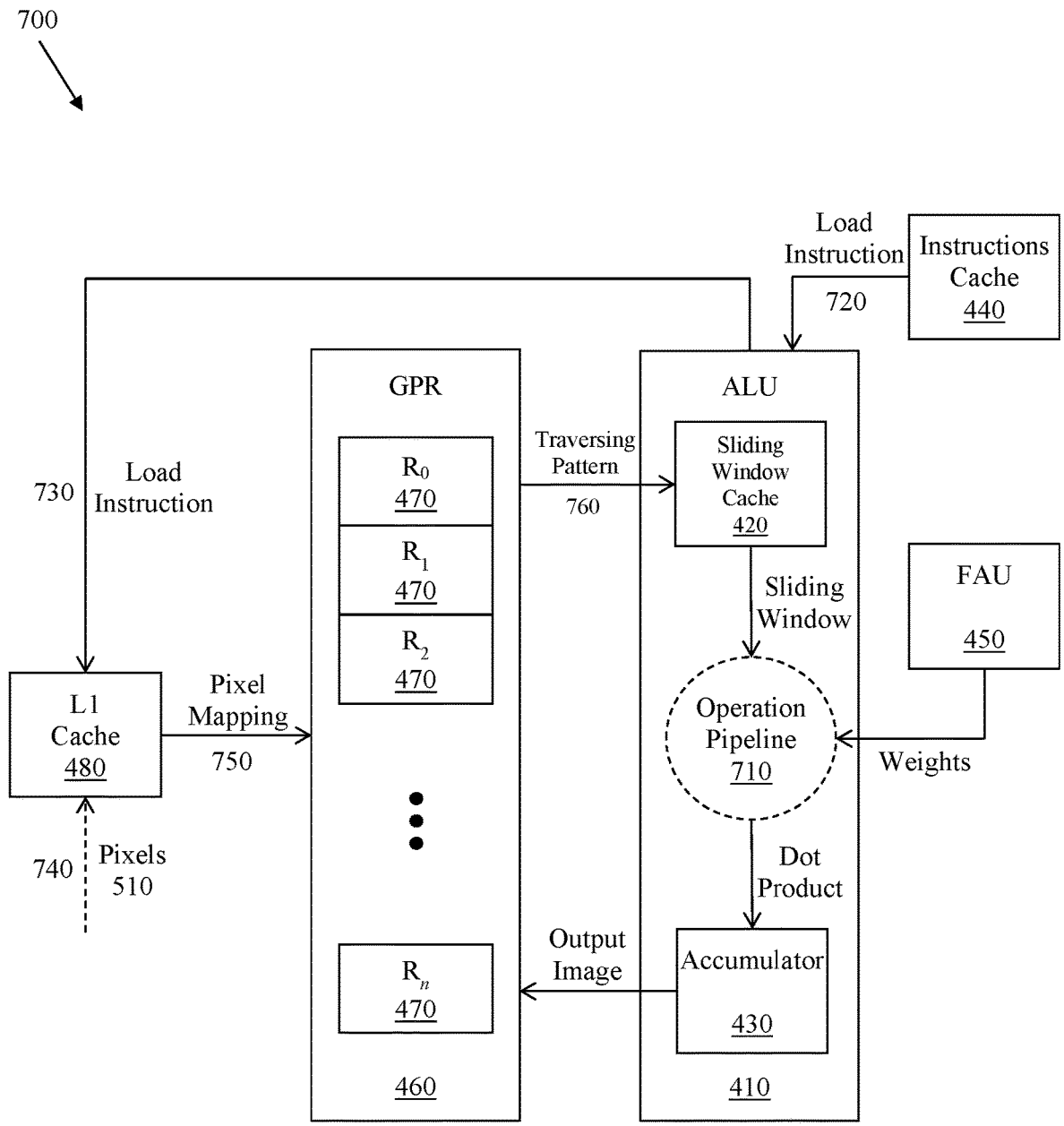
FIG. 7 is a data flow diagram demonstrating a convolution operation according to an embodiment of the disclosure.

FIG. 7 is a data flow diagram 700 demonstrating a convolution operation according to an embodiment of the disclosure. Generally, the core 400 performs the convolution operation. More specifically, the ALU 410 performs the convolution operation by executing a convolution operation instruction stored in the instructions cache 440. The convolution operation instruction instructs the ALU 410 and other components of the core 400 to perform actions on a per-warp basis, meaning that, if the warp comprises 32 threads, then those 32 threads simultaneously run the convolution operation instruction.

At step 720, the ALU 410 obtains a load instruction from the instructions cache 440. At step 730, the ALU 410 sends the load instruction to the L1 cache 480. At step 740, the L1 cache 480 executes the load instruction by retrieving the pixels 510 from an external memory such as the memory 140 in FIG. 1 and storing the pixels 510.

Figure 8:
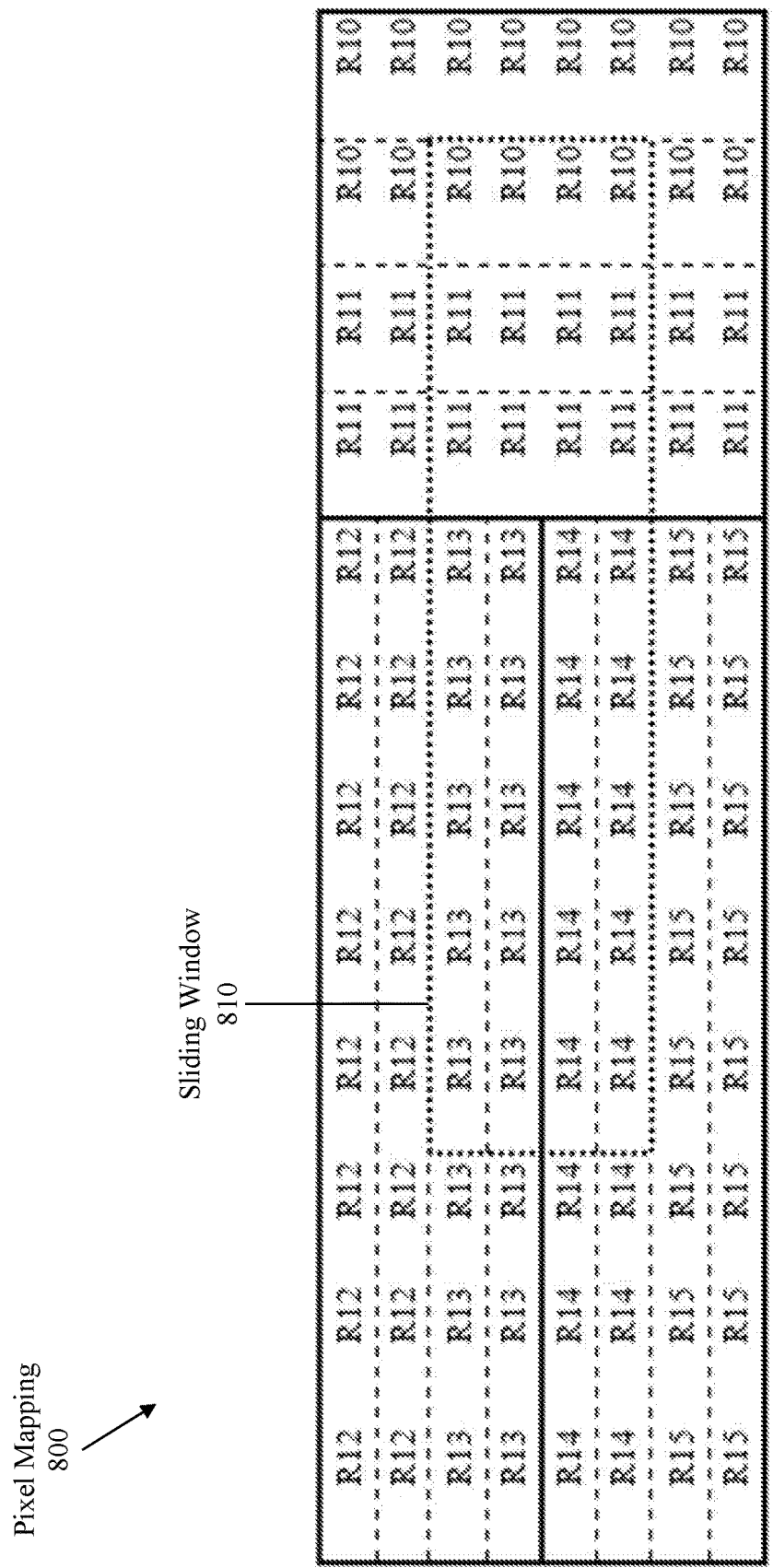
FIG. 8 is a schematic diagram showing a pixel mapping of the pixels in FIG. 5 to the registers in FIG. 4 according to an embodiment of the disclosure.

At step 750, the L1 cache 480 loads the pixels 510 into the registers 470 in the GPR 460 using a pixel mapping 800 shown in FIG. 8. The L1 cache 480 does so on a per-warp basis, meaning each thread of the warp loads all channels of one pixel 510 at a time. Because the warp comprises 32 threads, the warp loads 32 pixels 510 at a time. To load the pixels 510 into the registers 470, the L1 cache 480 locates data in its memory pool based on memory address calculations. The data represent the pixels 510. The L1 cache 480 then pushes the data into a memory bus along with lane information and destination addresses of the register 470. Finally, the memory bus sends the data to the registers 470 according to the destination addresses. This process is loosely referred to herein as "loading pixels."

FIG. 8 is a schematic diagram showing a pixel mapping 800 of the pixels 510 in FIG. 5 to the registers 470 in FIG. 4 according to an embodiment of the disclosure. The pixel mapping 800 comprises R10-R15, which denote the registers 470. Positions of the registers 470 in FIG. 8 correspond to positions of the pixels 510 in FIG. 6. Thus, by comparing FIG. 8 to FIG. 6, it can be seen that register R12 stores pixel p00, register R14 stores pixel p40, and so on. The pixel mapping 800 further comprises a sliding window 810, which is discussed below.

The pixel mapping 800 implements six rules. For a first rule, the L1 cache 480 segregates the pixels 510 into the three regions described above. The three regions are the starting pixels 600, the bottom padding pixels 610, and the right padding pixels 620. The number of starting pixels 600 is equal to the number of threads in the warp, so there are 32 starting pixels 600. The 32 starting pixels 600 form an 8×4 rectangle, meaning a rectangle with a width of 8 pixels and a height of 4 pixels. The number of bottom padding pixels 610 and the number of right padding pixels 620 are based on a filter size, S×R, indicated by the load instruction. S is a positive integer equal to a width of the filter, and R is a positive integer equal to a height of the filter. The bottom padding pixels 610 have a width of 8 and a height of R−1, in other words, 8 columns and R−1 rows. The right padding pixels 620 have a width of S−1 and a height of 4+R−1, in other words, S−1 columns and 4+R−1 rows. In this case, a filter size of 5×5 yields 32 bottom padding pixels 610 that form an 8×4 rectangle and 32 right padding pixels 620 that form a 4×8 rectangle.

For a second rule, the L1 cache 480 loads the pixels 510 into the registers 470 beginning with an anchor register 470 indicated by the load instruction. In this case, the anchor register 470 is register R12.

For a third rule, the L1 cache 480 loads the pixels 510 based on offsets from anchor register R12. Specifically, the L1 cache 480 loads the starting pixels 600 and the bottom padding pixels 610 based on a positive offset, and the L1 cache 480 loads the right padding pixels 620 based on a negative offset. A positive offset from anchor register R12 is register R13. Thus, the L1 cache 480 loads the starting pixels 600 into register R12 until it is full and then into register R13. Following that, the L1 cache 480 loads the bottom padding pixels 610 into register R14 until it is full and then into register R15. A negative offset from anchor register R12 is register R11. Thus, the L1 cache 480 loads the right padding pixels 620 into register R11 until it is full and then into register R10. If a column of the right padding pixels 620 has less than 8 pixels, then a gap is present. The gap size is (8−number of pixels in the column)×64 bits. For instance, for a 3×3 filter, there are 6 pixels in a column of the right padding pixels 620, so the gap is 128 bits. Thus, after loading p08~p58 into R11[383:0], the L1 cache 480 skips a gap of 128 bits in R11 for loading, which means the L1 cache 480 loads the next pixel, p09, into R11[575: 512]. The notation above indicates bit positions in the registers 470. For instance, R11[383:0] indicates the L1 cache 480 loads pixels p08~p58 into bits 0 to 383 in register R11. This approach makes the pixel mapping 800 independent of the filter size. Alternatively, the offsets are fixed offsets, where a positive number indicates a higher register number and a negative number indicates a lower register number. For instance, a fixed offset of 2 from anchor register R12 is register R14, and a fixed offset of −3 from anchor register R12 is R9.

For a fourth rule, the L1 cache 480 loads the starting pixels 600 and the bottom padding pixels 610 into the registers 470 in a horizontal manner. Thus, the L1 cache 480 loads the starting pixels 600 into register R12 beginning with pixel p00 and proceeding horizontally to pixel p07, then moving to pixel p10 and proceeding horizontally to pixel p17. After register R12 is filled with pixel p17, the L1 cache 480 loads the remaining starting pixels 600 and the bottom padding pixels 610 into register R13, then register R14, and then register R15 in a similar manner.

For a fifth rule, the L1 cache 480 loads the right padding pixels 620 into the registers 470 in a vertical manner. Thus, the L1 cache 480 loads the right padding pixels into register R11 beginning with pixel p08 and proceeding vertically to pixel p78, then moving to pixel p09 and proceeding vertically to pixel p79. After register R11 is filled with pixel p79, the L1 cache 480 loads the right padding pixels 620 into register R10 in a similar manner.

For a sixth rule, per pixel data location in a register is filter independent with respect to the anchor register 470. Thus, if a pixel presents in a region, then a location in the GPR 460 it is mapped to does not depend on the filter size.

Based on those six rules, the L1 cache 480 loads the pixels 510 as follows:
 p00 in R12[63:0], p01 in R12[127:64], . . . , p07 in R12[511:448]
 p10 in R12[575:512], p11 in R12[639:576], . . . , p17 in R12[1,023:960]
 p20 in R13[63:0], p21 in R13[127:64], . . . , p27 in R13[511:448]
 p30 in R13[575:512], p31 in R13[639:576], . . . , p37 in R13[1,023:960]
 p40 in R14[63:0], p41 in R14[127:64], . . . , p47 in R14[511:448]
 p50 in R14[575:512], p51 in R14[639:576], . . . , p57 in R14[1,023:960]
 p60 in R15[63:0], p61 in R15[127:64], . . . , p67 in R15[511:448]
 p70 in R15[575:512], p71 in R15[639:576], . . . , p77 in R15[1,023:960]
 p08 in R11[63:0], p18 in R11[127:64], . . . , p78 in R11[511:448]
 p09 in R11[575:512], p19 in R11[639:576], . . . , p79 in R11[1,023:960]
 p0a in R10[63:0], p1a in R10[127:64], . . . , p7a in R10[511:448]
 p0b in R10[575:512], p1b in R10[639:576], . . . , p7b in R10[1,023:960].

The notation above indicates bit positions in the registers 470. For instance, "p00 in R12[63:0]" indicates the L1 cache 480 loads pixel p00 into bits 0 to 63 in register R12, "p01 in R12[127:64]" indicates the L1 cache 480 loads pixel p01 into bits 64 to 127 in register R12, and so on. As mentioned above, the registers 470 each comprise 1,024 bits and the pixels 510 each comprise 64 bits.

Alternatively, instead of the pixel mapping 800, the L1 cache 480 loads the pixels 510 into the registers 470 in the GPR 460 using a different pixel mapping. For instance, an alternative pixel mapping implements seven rules. For a first rule, the L1 cache 480 segregates the pixels 510 into the starting pixels 600, the bottom padding pixels 610, and the right padding pixels 620 as described above. For a second rule, the L1 cache 480 loads channels c0~c1 of the starting pixels 600 into the anchor register 470, register R12. For a third rule, the L1 cache 480 loads channels c2~c3 of the starting pixels 600 into register R13. For a fourth rule, the L1 cache 480 loads channels c0~c1 of the bottom padding pixels 610 in register R14. For a fifth rule, the L1 cache 480 loads channels c2~c3 of the bottom padding pixels 610 in register R15. For a sixth rule, the L1 cache 480 loads channels c0~c1 of the right padding pixels 620 into register R11 or register R16. For a seventh rule, the L1 cache 480 loads channels c2~c3 of the right padding pixels 620 into register R10 or register R17.

Returning to FIG. 7, at step 760, the ALU 410 reads the starting pixels 600 from the registers 470, stores the starting pixels 600 as the sliding window 810 in buffer A of the sliding window cache 420, and copies into buffer B the starting pixels 600 to be used later on. The ALU 410 uses the sliding window 810 from the sliding window cache 520 and a first weight from the FAU 450 to calculate a dot product for each of the starting pixels 600, stores the dot products in the accumulator 430, shifts the sliding window 810 according to a traversing pattern, and repeats the process until the convolution operation is complete. The dot products are part of the convolution operation and may be referred to as intermediate calculations because they occur before the convolution operation ends by adding the dot products. The sliding window 810 comprises a 4×8 region of the pixels 510 for a total of 2,048 bits. The size 4×8 denotes 4 rows and 8 columns. Buffer A comprises 2,048 bits, which can make up 32 pixels, and buffer B comprises 1,536 bits, which can make up 24 pixels. The threads access the sliding window 810 using a thread mapping shown in FIG. 9.

Figure 9:
FIG. 9 is a schematic diagram showing a thread mapping of the pixels in FIG. 5 to the threads according to an embodiment of the disclosure.

FIG. 9 is a schematic diagram 900 showing a thread mapping of the pixels 510 in FIG. 5 to the threads according to an embodiment of the disclosure. The schematic diagram 900 comprises T0-T31, which denote the threads associated with the sliding window 810. Positions of the threads in FIG. 9 correspond to positions of the pixels 510 in FIG. 6 and the registers 470 in FIG. 8. Thus, by comparing FIG. 9 to FIGS. 6 and 8, it can be seen that, when the ALU 410 reads pixels from the sliding window 810, thread 0 accesses pixel p23 from register R13, thread 1 accesses pixel p24 from register R13, and so on.

The sliding window 810 may be identified by its top-left corner. Looking at FIG. 8, if the top-most row is row 2 and the left-most column is column 3, then the sliding window 810 is at position (2,3). To perform the convolution operation, the sliding window 810 slides its position so that the threads can access each of the pixels 510. When the sliding window 810 slides one column to the right to position (2,4), the threads obtain data as follows:
 T0←T1, T1←T2, . . . , T6←T7
 T8←T9, T9←T10, . . . , T14←T15
 T16←T17, T17←T18, . . . , T22←T23
 T24←T25, T25←T26, . . . , T30←T31.

As shown, thread TO obtains the data of thread T1, thread T1 obtains the data of thread T2, and so on. However, threads T7, T15, T23, and T31 cannot obtain data from within the sliding window 810 because they are on the right-hand side of the sliding window. Thus, looking at the column to the right of the sliding window 810 in FIG. 8, threads T7, T15, T23, and T31 obtain data as follows:

T7←R10[703:640]
T15←R10[767,704]
T23←R10[831,768]
T31←R10[895,832].

As another example, when the sliding window 810 slides from position (0,4) to (1,0), threads T0~T23 obtain data from buffer B of the sliding window cache 420, where the data of T8~T31 in buffer A were copied into buffer B when the sliding window was at position (0, 0). However, threads T24~T31 obtain data from reading from the registers 470 as follows:

T24←R14[63:0], T25←R14[127:64], . . . , T31←R14[511:448].

The sliding window 810 slides according to a traversing pattern. The traversing pattern comprises sliding right one column S-1 times until reaching a right-most position, sliding down one row and left to the farthest left column, and repeating that pattern. S is a positive integer equal to a width of the filter. That traversing pattern may yield a simplest hardware design. Alternatively, the sliding window 810 slides according to another traversing pattern. For instance, the traversing pattern could comprise sliding from right to left or in any other direction towards boundaries of the pixels 510.

If the sliding window 810 is 8×4 and the ALU 410 uses a filter of size S×R to perform the convolution operation, then the size of the region of the pixels 510 used is (8+S-1)×(4+R-1). In that case, the sliding window 810 slides a total of S×R times. If the image 500 comprises 4 channels, then the ALU 410 calculates the output image as follows:

$$\text{output}(row, column) = \text{sum}(I[row+j, column+i, k] \times F[j, i, k]), \quad (1)$$

where I is an input image, F is a filter, $0 \le i < S$, $0 \le j < R$, and $0 \le k \le 3$. For each term, the input from I is the data for the sliding window 810 at position (j,i), the input from F is the weight at (j,i) stored in the FAU 450 and corresponding to the sliding window 810 at position (j,i), and k is a channel. Formula (1) defines the convolution of I and F. The ALU 410 performs S×R steps to complete an operation pipeline 710. The accumulator 430 adds the dot products from the operation pipeline 710 to calculate the output image, the accumulator 430 passes the output image to the GPR 460, and the GPR 460 stores the output image.

Buffer A of the sliding window cache 420 may comprise multiplexers for internal data management of the sliding window 810. The multiplexers may comprise a multiplexer for each thread except threads T7, T15, T23, and T31 so that each thread can shift its data to its left neighbor, except threads TO, T8, T16, and T24. Buffer B of the sliding window cache 420 may comprise multiplexers that move data from and to buffer A.

If a first weight address is A, then, following the steps above, the ALU 410 performs the convolution operation as follows:

| Sliding Window Position | Cycle number | GPR/FAU read | Internal pixel data movement | In first a few cycles . . . |
|---|---|---|---|---|
| (0, 0) | 0 | ALU reads 128B from register R12 into T0~T15 of buffer A. | | ALU 410 reading data from registers 470 for first 16 starting pixels 600 |
| (0, 0) | 1 | ALU reads 128B from register R13 into T16~T31 of buffer A, and 8B from FAU at address A into internal flops weight; increment FAU address A+ = 8; | | ALU 410 reading data from registers 470 for second 16 starting pixels 600 |
| (0, 1) | 2 | | ALU copies data of T8~T31 in buffer A into buffer B. | 1. Pipe 0 of dot product of data in buffer A and weight for the first 16 threads (i.e. T0~T15) |
| (0, 1) | 3 | ALU reads 8B from R11[63:0] into T7, from R11[127:64] into T15, from R11[191:128] into T23, from R11[255:192] into T31, 8B from FAU at A into weight, A+ = 8; | ALU moves pixel data in buffer A into its left neighbor: T0←T1 . . . T6←T7; T8←T9 . . . T14←T15; T16←T17 . . . T22←T23; T24←T25 . . . T30←T31; | 1. Pipe 0 of dot product of data in buffer A and weight for the second 16 threads (i.e. T16~T31). 2. Pipe 1 of dot product from cycle 2, which is a continuing of dot product pipeline for the dot product started at cycle 2. |
| (0, 2) | 4 | | | 1. Pipe 0 of dot product of data in buffer A and weight for the first 16 threads (i.e. T0~T15) |

-continued

| Sliding Window Position | Cycle number | GPR/FAU read | Internal pixel data movement | In first a few cycles . . . |
|---|---|---|---|---|
| | | | | 2. Pipe 1 of dot product from cycle 3, which is a continuing of dot product pipeline for the dot product started at cycle 3. 3. At this cycle the dot product started from cycle 2 is done, so the results can be added into the accumulator, note this is for T0~T15. |
| (0, 2) | 5 | ALU reads 8B from R11[575:512] into T7, from R11[639:576] into T15, from R11[703:640] into T23, from R11[767:704] into T31, 8B from FAU at A into weight, A+ = 8; | ALU moves pixel data in buffer A into its left neighbor. | 1. Pipe 0 of dot product of data in buffer A and weight for the second 16 threads (i.e. T16~T31). 2. Pipe 1 of dot product from cycle 4. 3. At this cycle the dot product started from cycle 3 is done, so the results can be added into the accumulator, note this is for T16~T31. |
| (0, 3) | 6 | | | 1. Pipe 0 of dot product of data in buffer A and weight for the first 16 threads (i.e. T0~T15) 2. Pipe 1 of dot product from cycle 5. 3. At this cycle the dot product started from cycle 4 is done, so the results can be added into the accumulator, note this is for T0~T15 |
| (0, 3) | 7 | ALU reads 8B from R10[63:0] into T7, from R10[127:64] into T15, from R10[191:128] into T23, from R10[255:192] into T31, 8B from FAU at A into weight, A+ = 8; | ALU moves pixel data in buffer A into its left neighbor. | 1. Pipe 0 of dot product of data in buffer A and weight for the second 16 threads (i.e. T16~T31). 2. Pipe 1 of dot product from cycle 6. 3. At this cycle the dot product started from cycle 5 is done, so the results can be added into the accumulator, note this is for T16~T31. |
| (0, 4) | 8 | | | 1. Pipe 0 of dot product of data in buffer A and weight for the first 16 threads (i.e. T0~T15) 2. Pipe 1 of dot product from cycle 7. |

-continued

| Sliding Window Position | Cycle number | GPR/FAU read | Internal pixel data movement | In first a few cycles . . . |
|---|---|---|---|---|
| | | | | 3. At this cycle the dot product started from cycle 6 is done, so the results can be added into the accumulator, note this is for T0~T15 |
| (0, 4) | 9 | ALU reads 8B from R10[575:512] into T7, from R10[639:576] into T15, from R10[703:640] into T23, from R10[767:704] into T31, 8B from FAU at A into weight, A+ = 8; | ALU moves pixel data in buffer A into its left neighbor. | 1. Pipe 0 of dot product of data in buffer A and weight for the second 16 threads (i.e. T16~T31). 2. Pipe 1 of dot product from cycle 8. 3. At this cycle the dot product started from cycle 7 is done, so the results can be added into the accumulator, note this is for T16~T31. |
| (1, 0) | 10 | | | 1. Pipe 0 of dot product of data in buffer A and weight for the first 16 threads (i.e. T0~T15) 2. Pipe 1 of dot product from cycle 9. 3. At this cycle the dot product started from cycle 8 is done, so the results can be added into the accumulator, note this is for T0~T15 |
| (1, 0) | 11 | ALU reads 64B from R14[511:0] into T24~T31, 8B from FAU at A into weight, A+ = 8; | ALU copies data in buffer B into T0~T23 in buffer A, copies T12~T15 in buffer A into buffer B 1st row and last 4 columns, copies T20~T23 in buffer A into buffer B 2nd row and last 4 columns, copies T28~T31 in buffer A into buffer B 3rd row and last 4 columns; | 1. Pipe 0 of dot product of data in buffer A and weight for the second 16 threads (i.e. T16~T31). 2. Pipe 1 of dot product from cycle 10. 3. At this cycle the dot product started from cycle 9 is done, so the results can be added into the accumulator, note this is for T16~T31. |

-continued

| Sliding Window Position | Cycle number | GPR/FAU read | Internal pixel data movement | In first a few cycles . . . |
|---|---|---|---|---|
| (1, 1) | 12 | | ALU copies T8~T11 in buffer A into buffer B 1st row and 1st 4 columns, copies T16~T19 in buffer A into buffer B 2nd row and 1st 4 columns, copies T24~T27 in buffer A into buffer B 3rd row and 1st 4 columns; | 1. Pipe 0 of dot product of data in buffer A and weight for the first 16 threads (i.e. T0~T15) 2. Pipe 1 of dot product from cycle 11. 3. At this cycle the dot product started from cycle 10 is done, so the results can be added into the accumulator, note this is for T0~T15 |
| (1, 1) | 13 | ALU reads 8B from R11[319:256] into T31, 8B from FAU at A into weight, A+ = 8; | ALU moves pixel data in buffer A into its left neighbor, copies buffer B 5th column into T7, T15, T23 of buffer A, copies T12, T20, T28 of buffer A into buffer B 5th column; | Pipe operations at this cycle is similar to the above cycles, and we omit them starting from this cycle. |
| (1, 2) | 14 | | | |
| (1, 2) | 15 | Read 8B from R11[831:768] into T31, 8B from FAU at A into weight, A+ = 8; | ALU moves pixel data in buffer A into its left neighbor, copies buffer B 6th column into T7, T15, T23 of buffer A, copies T12, T20, T28 of buffer A into buffer B 6th column; | |
| (1, 3) | 16 | | | |
| (1, 3) | 17 | Read 8B from R10[8 319:256] into T31, 8B from FAU at A into weight, A+ = 8; | ALU moves pixel data in buffer A into its left neighbor, copies buffer B 7th column into T7, T15, T23 of buffer A, copies T12, T20, T28 of buffer A into buffer B 7th column; | |
| (1, 4) | 18 | | | |
| (1, 4) | 19 | Read 8B from R10[831:768] into T31, 8B from FAU at A into weight, A+ = 8; | ALU moves pixel data in buffer A into its left neighbor, copies buffer B 8th column into T7, T15, T23 of buffer A, copies T12, T20, T28 of buffer A into buffer B 8th column; | |
| (2, 0) | 20 | | | |
| (2, 0) | 21 | Read 64B from R14[1023:512] into T24~T31, 8B from FAU at A into weight, A+ = 8; | ALU copies data in buffer B into T0~T23 in buffer A, copies T12~T15 in buffer A into buffer B 1st row and last 4 columns, copies T20~T23 in buffer A into buffer B 2nd row and last 4 columns, copies T28~T31 in buffer A into buffer B 3rd row and last 4 columns; | |
| (2, 1) | 22 | | ALU copies T8~T11 in buffer A into buffer B 1st row and 1st 4 columns, copies T16~T19 in buffer A into buffer B 2nd row and 1st 4 columns, copies T24~T27 in buffer A into buffer B 3rd row and 1st 4 columns; | |

-continued

| Sliding Window Position | Cycle number | GPR/FAU read | Internal pixel data movement | In first a few cycles . . . |
|---|---|---|---|---|
| (2, 1) | 23 | Read 8B from R11[383:320] into T31, 8B from FAU at A into weight, A+ = 8; | ALU moves pixel data in buffer A into its left neighbor, copies buffer B 5th column into T7, T15, T23 of buffer A, copies T12, T20, T28 of buffer A into buffer B 5th column; | |
| (2, 2) | 24 | | | |
| (2, 2) | 25 | Read 8B from R11[895:832] into T31, 8B from FAU at A into weight, A+ = 8; | Internal data movement is exactly the same as 10 cycle before this cycle. We will omit them starting from this cycle since the same rule is true for any following cycles. | |
| (2, 3) | 26 | | | |
| (2, 3) | 27 | Read 8B from R10[383:320] into T31, 8B from FAU at A into weight, A+ = 8; | | |
| (2, 4) | 28 | | | |
| (2, 4) | 29 | Read 8B from R10[895:832] into T31, 8B from FAU at A into weight, A+ = 8; | | |
| (3, 0) | 30 | | | |
| (3, 0) | 31 | Read 64B from R15[511:0] into T24~T31, 8B from FAU at A into weight, A+ = 8; | | |
| (3, 1) | 32 | | | |
| (3, 1) | 33 | Read 8B from R11[447:384] into T31, 8B from FAU at A into weight, A+ = 8; | | |
| (3, 2) | 34 | | | |
| (3, 2) | 35 | Read 8B from R11[959:896] into T31, 8B from FAU at A into weight, A+ = 8; | | |
| (3, 3) | 36 | | | |
| (3, 3) | 37 | Read 8B from R10[447:384] into T31, 8B from FAU at A into weight, A+ = 8; | | |
| (3, 4) | 38 | | | |
| (3, 4) | 39 | Read 8B from R10[959:896] into T31, 8B from FAU at A into weight, A+ = 8; | | |
| (4, 0) | 40 | | | |
| (4, 0) | 41 | Read 64 from R15[1023:512] into T24~T31, 8B from FAU at A into weight, A+ = 8; | | |
| (4, 1) | 42 | | | |
| (4, 1) | 43 | Read 8B from R11[511:448] into T31, 8B from FAU at A into weight, A+ = 8; | | |
| (4, 2) | 44 | | | |
| (4, 2) | 45 | Read 8B from R11[1,023:960] into T31, 8B from FAU at A into weight, A+ = 8; | | |
| (4, 3) | 46 | | | |
| (4, 3) | 47 | Read 8B from R10[511:448] into T31, 8B from FAU at A into weight, A+ = 8; | | |

-continued

| Sliding Window Position | Cycle number | GPR/FAU read | Internal pixel data movement | In first a few cycles . . . |
|---|---|---|---|---|
| (4, 4) | 48 | | | |
| (4, 4) | 49 | Read 8B from R10[1,023:960] into T31, 8B from FAU at A into weight, A+ = 8; | | |

Figure 10:
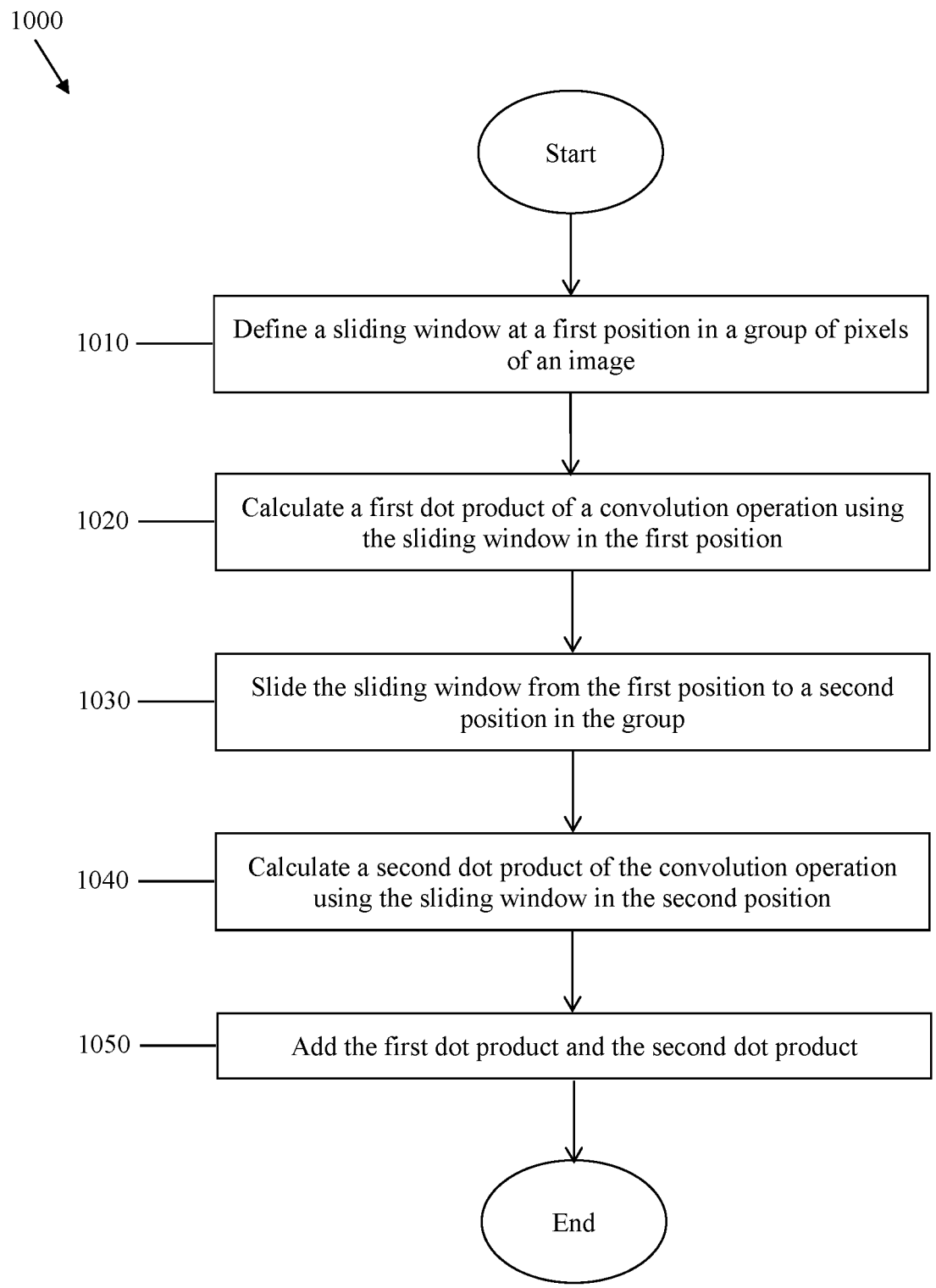
FIG. 10 is a flowchart illustrating a method of using a sliding window to perform a convolution operation according to an embodiment of the disclosure.

FIG. 10 is a flowchart illustrating a method 1000 of using a sliding window to perform a convolution operation according to an embodiment of the disclosure. The core 400 implements the method 1000. At step 1010, a sliding window is defined at a first position in a group of pixels in an image. For instance, the ALU 410 defines the sliding window 810 at position (2,3) in the pixel mapping 800 in FIG. 8 and the ALU 410 stores the sliding window 810 in the sliding window cache 420. At step 1020, a first dot product of a convolution operation is calculated using the sliding window in the first position. For instance, the ALU 410 calculates a dot product according to equation (1) as part of the operation pipeline 710, where j=2; i=3; and k is 0, 1, 2, 3. Thus, the dot product is equal to $[1(2,3,0) \times F(2,3,0)]+[I(2,3,1) \times F(2,3,1)]+[I(2,3,2) \times F(2,3,2)]+[I(2,3,3) \times F(2,3,3)]$. That dot product corresponds to thread 0. Threads 1-31 are different for I, but have the same F in equation (1). At step 1030, the sliding window is slid from the first position to a second position in the group. For instance, the ALU 410 slides the sliding window 810 from position (2,3) to position (2,4) in the pixel mapping 800 in FIG. 8 and the ALU 410 stores the sliding window 810 in the sliding window cache 420. At step 1040, a second dot product of the convolution operation is calculated using the sliding window in the second position. For instance, the ALU 410 calculates a dot product according to equation (1) as part of the operation pipeline 710, where j=2; i=4; and k is 0,1,2,3. Thus, the dot product is equal to $[I(2,4,0) \times F(2,4,0)]+[I(2,4,1) \times F(2,4,1)]+[I(2,4,2) \times F(2,4,2)]+[I(2,4,3) \times F(2,4,3)]$. Finally, at step 1050, the first dot product and the second dot product are added. For instance, the accumulator 430 adds the first dot product and the second dot product. The accumulator 430 does so for each iteration so that it adds the current dot product to an accumulation of the previous dot products.

Though specific sizes, numbers, or positions of warps, pixels, channels, filters, regions, anchor registers, and other components are shown, the embodiments apply to any sizes, numbers, positions, or other metrics of such components. In addition, though images that are 2D arrays of pixels with RGB channels are described, the embodiments apply to images that are 3D arrays such as feature maps with width, height, and depth channels, as well as images that are other data structures.

In an example embodiments, a GPU comprises: a GPR element comprising register elements; an L1 cache element coupled to the GPR element and configured to implement a pixel mapping by: segregating pixels of an image into regions, the regions comprise a first region and a second region, the first region comprises first pixels, and the second region comprises second pixels, loading the first pixels into the GPR element in a horizontal manner, and loading the second pixels into the GPR element in a vertical manner; and an ALU element configured to read the first pixels and the second pixels independently of a shared memory element.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A graphics processing unit (GPU) comprising:
a general purpose register (GPR) comprising registers;
a level 1 (L1) cache coupled to the GPR and configured to implement a pixel mapping by:
    segregating pixels of an image into regions, the regions comprise a first region, a second region, and a third region, the first region comprises first pixels that are starting pixels, the second region comprises second pixels that are right padding pixels, and the third region comprises third pixels that are bottom padding pixels,
    loading the first pixels into the registers in a horizontal manner,
    loading the second pixels into the registers in a vertical manner, and
    loading the third pixels into the registers in the horizontal manner; and
an arithmetic logic unit (ALU) configured to read the first pixels and the second pixels independently of a shared memory.

2. The GPU of claim 1, wherein the registers comprise an anchor register, and wherein the L1 cache is further configured to implement the pixel mapping by further loading the first pixels beginning with the anchor register and based on a positive offset from the anchor register.

3. The GPU of claim 1, wherein the registers comprise an anchor register, and wherein the L1 cache is further configured to implement the pixel mapping by further loading the second pixels based on a negative offset from the anchor register.

4. The GPU of claim 1, wherein the pixel mapping is independent of a filter size.

5. The GPU of claim 1, wherein the ALU is further configured to perform a convolution operation based on the pixel mapping.

6. The GPU of claim 1, wherein the GPU is configured to:
define a sliding window at a first position in a group of the pixels;
calculate a first dot product of a convolution operation using the sliding window in the first position;
slide the sliding window from the first position to a second position in the group;
calculate a second dot product of the convolution operation using the sliding window in the second position; and
add the first dot product and the second dot product.

7. The GPU of claim 6, wherein the GPU is further configured to determine that the first position is not a right-most position in the group, and wherein the second position is one column to the right of the first position.

8. The GPU of claim 6, wherein the GPU is further configured to determine that the first position is a right-most position in the group, and wherein the second position is one row below the first position and to a farthest-left column.

9. The GPU of claim 6, wherein the convolution operation implements a filter of size S×R, wherein S is a width and is a positive integer, and wherein R is a height and is a positive integer.

10. The GPU of claim 9, wherein the GPU is further configured to slide the sliding window a total of S×R times to complete the convolution operation.

11. The GPU of claim 10, wherein the sliding window comprises 4 rows and 8 columns of the pixels.

12. The GPU of claim 6, wherein the image is associated with a plurality of channels, and wherein the GPU is further configured to perform the convolution operation for each channel.

13. A graphics processing unit (GPU) comprising:
a general purpose register (GPR) comprising registers, wherein the registers comprise an anchor register;
a level 1 (L1) cache coupled to the GPR and configured to implement a pixel mapping by:
loading an image into the L1 cache and segregating pixels of the image into regions, the regions comprise a first region and a second region, the first region comprises first pixels, and the second region comprises second pixels,
loading the first pixels into the GPR in a horizontal manner, beginning with the anchor register, and based on fixed offsets, and
loading the second pixels into the GPR in a vertical manner, beginning with the anchor register, and based on fixed offsets; and
an arithmetic logic unit (ALU) configured to read the first pixels and the second pixels independently of a shared memory.

14. A graphics processing unit (GPU) comprising:
an instructions cache configured to:
store a load instruction associated with shared pixels, and
store a convolution instruction associated with the shared pixels;
a level 1 (L1) cache configured to execute the load instruction using the shared pixels; and
an arithmetic logic unit (ALU) coupled to the instructions cache and the L1 cache and configured to:
store the shared pixels independent of a shared memory, and
execute the convolution instruction using the shared pixels.

15. The GPU of claim 14, wherein the ALU comprises a sliding window cache configured to store the shared pixels.

16. The GPU of claim 15, wherein the shared memory is external to the ALU.

17. The GPU of claim 14, further comprising a general purpose register (GPR).

18. The GPU of claim 17, wherein the L1 cache is further configured to load the shared pixels in the GPR.

19. The GPU of claim 18, wherein the ALU is further configured to read the shared pixels from the GPR.

20. The GPU of claim 14, wherein the ALU comprises an accumulator configured to store intermediate calculations of an operation.

* * * * *